United States Patent [19]
Wiedeman

[11] Patent Number: 5,634,190
[45] Date of Patent: May 27, 1997

[54] LOW EARTH ORBIT COMMUNICATION SATELLITE GATEWAY-TO-GATEWAY RELAY SYSTEM

[75] Inventor: Robert A. Wiedeman, Los Altos, Calif.

[73] Assignee: Globalstar L.P., San Jose, Calif.

[21] Appl. No.: 465,938

[22] Filed: Jun. 6, 1995

[51] Int. Cl.$^6$ .................................................. H04B 7/185
[52] U.S. Cl. .......................................... 455/13.1; 455/15
[58] Field of Search .................................. 455/12.1, 13.1, 455/13.2, 15, 20, 33.1, 54.1, 56.1; 375/200

[56] References Cited

U.S. PATENT DOCUMENTS

| Re. 32,905 | 4/1989 | Baran | 370/104 |
|---|---|---|---|
| 4,901,307 | 2/1990 | Gilhousen et al. | 370/18 |
| 5,010,317 | 4/1991 | Schwendeman et al. | 340/311.1 |
| 5,042,083 | 8/1991 | Ichikawa | 455/33 |
| 5,073,900 | 12/1991 | Mallinckrodt | 375/1 |
| 5,081,703 | 1/1992 | Lee | 455/13 |
| 5,109,390 | 4/1992 | Gilhousen et al. | 375/1 |
| 5,119,225 | 6/1992 | Grant et al. | 359/172 |
| 5,179,720 | 1/1993 | Grube et al. | 455/16 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,303,286 | 4/1994 | Wiedeman | 379/59 |
| 5,327,572 | 7/1994 | Freeburg | 455/13.1 |
| 5,339,330 | 8/1994 | Mallinckrodt | 375/1 |
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |

FOREIGN PATENT DOCUMENTS

| 0421698A3 | 10/1991 | European Pat. Off. . |
|---|---|---|
| WO90/13186 | 11/1990 | WIPO . |
| WO91/09473 | 6/1991 | WIPO . |

OTHER PUBLICATIONS

"Iridum System Overview", Modern Science and Technology Monthly, Nov. 1991, pp. 1–5.

Petition of American Mobile Satellite Corporation Before the FCC, Washington, DC 20554, dated Jun. 3, 1991, pp. 1–15.

Application of Motorola Satellite Communications, Inc. for Iridium A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

"Application of TRW Inc. for Authority to Construct a New Communications Satellite System Odyssey" before the FCC, Washington, D.C. 20554, May 31, 1991 pp. 33–51.

Application of Ellipsat Corporation Ellipsat for the Authority to Construct Ellipso $^R$I An Elliptical Orbit Satellite System, before the FCC, Washington, D.C. 20554, Nov. 2, 1990, pp. 5–34.

(List continued on next page.)

*Primary Examiner*—Reinhard J. Eisenzopf
*Assistant Examiner*—Marsha D. Banks-Harold
*Attorney, Agent, or Firm*—Perman & Green LLP

[57] ABSTRACT

This invention teaches the use of overlapping footprints in a LEO satellite communications system to increase the overall connectivity of the system, thus providing a wide service availability. In particular, this invention teaches the use of at least one terrestrial LEOS relay station (70) that is positioned within an overlap of at least two satellite coverage areas for relaying a communication from a gateway (18A) associated with a first coverage area to a gateway (18B) associated with a second coverage area. A plurality of LEOS relay stations can be so provided to enable a communication, such as a voice communication, to be routed through a plurality of coverage areas and gateways, thereby bypassing a substantial portion of an underlying terrestrial communication system.

14 Claims, 10 Drawing Sheets

OTHER PUBLICATIONS

Application of Loral Cellular Systems, Corp., Globalstar Mobile COmmunications Wherever You Are, before the FCC, Washington, D.C. Jun.3, 1991, pp. 94–187.

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Transactions, vol. E 74, No. 8 Aug. 1991, pp. 2201–2210.

"Digital Network Oriented Mobile Radio Satellite System as an Integrated Part of the GSM Cellular Radio System in Europe", P. Dondl, Deutsch BUndespost/Fernmeldetechniches Zentralmt/Darmstadt, Sep. 21, 1989 Feb. Rep. Germ.

"The OniTRACS" Mobile Satellite Communications and Positioning System, E. Tiedemann, Jr. et al., Vehicle Electronics in the 90's: Proceedings of the In'l Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium™1 System —A Revolutionary Satellite Communications System Developed with Innovative Applications of Technology", D. Sterling et al., IEEE, Milcom 1991, Nov. 4–7.

"Iridium: Key to Worldwide Cellular Communications", J. Foley, Telecommunications, Oct. 1991, pp. 23–28.

LOW EARTH ORBIT COMMUNICATION SATELLITE GATEWAY-TO-GATEWAY RELAY SYSTEM

FIELD OF THE INVENTION

This invention relates generally to communications systems and, in particular, to a low earth orbit (LEO) satellite-based communications system.

BACKGROUND OF THE INVENTION

Satellite-based communications systems are well are represented in the prior art. By example, reference is made to U.S. Pat. No. 5,303,286, issued on Apr. 12, 1994 to Robert A. Wiedeman, and which is entitled "Wireless Telephone/Satellite Roaming System". Reference is also made to the numerous U.S. Patents, foreign patents, and other publications that are of record in U.S. Pat. No. 5,303,286.

Of particular interest herein is a class of satellite-based communications systems that employs multiple satellites in a low earth orbit, referred to as a 'LEO' system or LEOS. LEOS are characterized by moving patterns of signal 'footprints' on the ground, where each footprint corresponds to the coverage area of one or more beams that are transmitted and received by a given satellite as it orbits the earth. The satellites communicate with terrestrial stations which may be referred to as 'gateways'.

It is often the case that two or more satellites of a constellation of LEO satellites will have overlapping footprints or coverage areas. The presence of overlapping coverage areas enables a ground-based receiver to simultaneously receive a communication signal from and transmit a communication signal through a plurality of satellites whose coverage areas overlap. For a receiver that receives multiple copies of the same signal through a plurality of satellites the effects of multi-path fading and signal blockage can be greatly reduced. Reference in this regard can be had to U.S. Pat. No. 5,233,626, issued Aug. 3, 1993 to Stephen A. Ames and entitled "Repeater Diversity Spread Spectrum Communication System", the disclosure of which is incorporated by reference herein in its' entirety.

Communication systems that make use of repeater diversity generally use spread spectrum (SS) techniques, and possibly also code division multiple access (CDMA) as the modulation scheme in order to maximize the communications capability. In such systems there is a desire to cause the satellite footprints and any interior beams generated to have the maximum overlap possible to maximize the use of diversity techniques to combat fading and blockage.

SUMMARY OF THE INVENTION

This invention is directed to a unique use of overlapping footprints in a LEO satellite communications system to increase the overall connectivity of the system, thus providing a wide service availability. In particular, this invention teaches the use of at least one terrestrial LEOS relay station that is positioned within an overlap of at least two satellite coverage areas for relaying a communication from a gateway associated with a first coverage area to a gateway associated with a second coverage area. A plurality of LEOS relay stations can be so provided to enable a communication, such as a voice communication, to be routed through a plurality of coverage areas and gateways, thereby bypassing a substantial portion of an underlying terrestrial communication system.

More particularly, this invention teaches a ground-based repeater station for use with a plurality of low earth orbit (LEO) communication satellites individual ones of which have an associated ground coverage area. The repeater station includes a first transceiver for receiving a downlink transmission from a first one of the LEO communication satellites associated with a first coverage area and for transmitting the received transmission on an uplink to a second one of the LEO communication satellites associated with a second coverage area that overlaps the first coverage area. The repeater station further includes a second transceiver for receiving a downlink transmission from the second one of the LEO communication satellites associated with the second coverage area and for transmitting the received transmission on an uplink to the first one of the LEO communication satellites associated with the first coverage area. The repeater station further includes a demodulator for demodulating a call request transmission that is received from the first LEO communication satellite; a controller for extracting call destination information from the demodulated call request transmission and for selecting a LEO communication satellite to receive the uplink transmission.

In a preferred embodiment of this invention the demodulator includes circuitry for despreading and tracking a spread spectrum signal that is received from the first LEO communication satellite.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
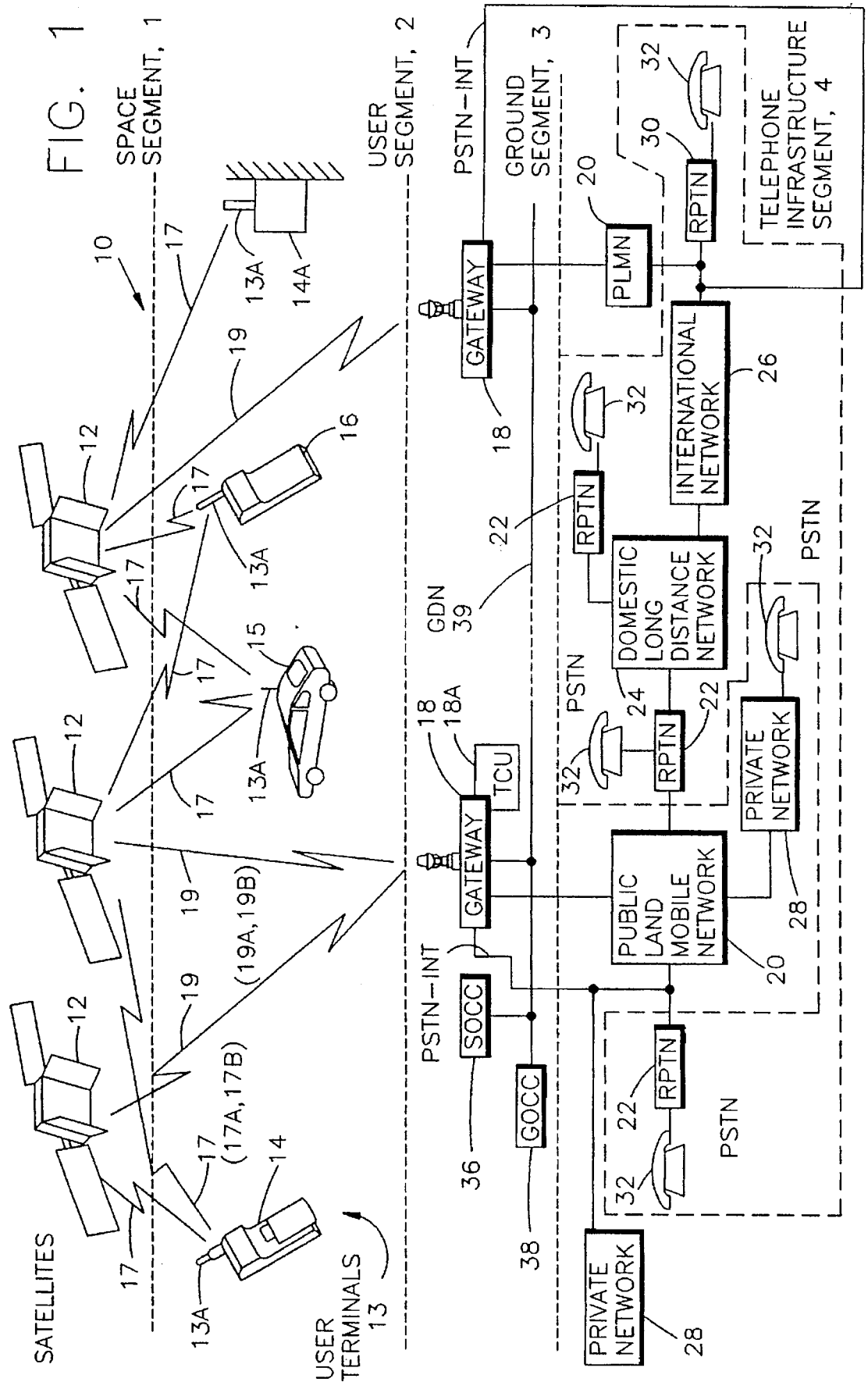
FIG. 1 is block diagram of a satellite communication system that is constructed and operated in accordance with a presently preferred embodiment of this invention.

FIG. 1 illustrates a presently preferred embodiment of a satellite communication system 10 that is suitable for use with the presently preferred embodiment of this invention. Before describing this invention in detail, a description will first be made of the communication system 10 so that a more complete understanding may be had of the present invention.

The communications system 10 may be conceptually subdivided into a plurality of segments 1, 2, 3 and 4. Segment 1 is referred to herein as a space segment, segment 2 as a user segment, segment 3 as a ground (terrestrial) segment, and segment 4 as a telephone system infrastructure segment.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board signal processing of a received communications traffic signal occurs, and the satellite 12 does not become aware of any intelligence that a received or transmitted communications traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile radio-telephones 15, paging/messaging-type devices 16, and fixed radio-telephones 14a. The user terminals 13 are preferably provided with omnidirectional antennas 13a for bidirectional communication via one or more of the satellites 12.

It is noted that the fixed radio-telephones 14a may employ a directional antenna. This is advantageous in that it enables a reduction in interference with a consequent increase in the number of users that can be simultaneously serviced with one or more of the satellites 12.

It is further noted that the user terminals 13 may be dual use devices that include circuitry for also communicating in a conventional manner with a terrestrial cellular system.

Figure 3A:
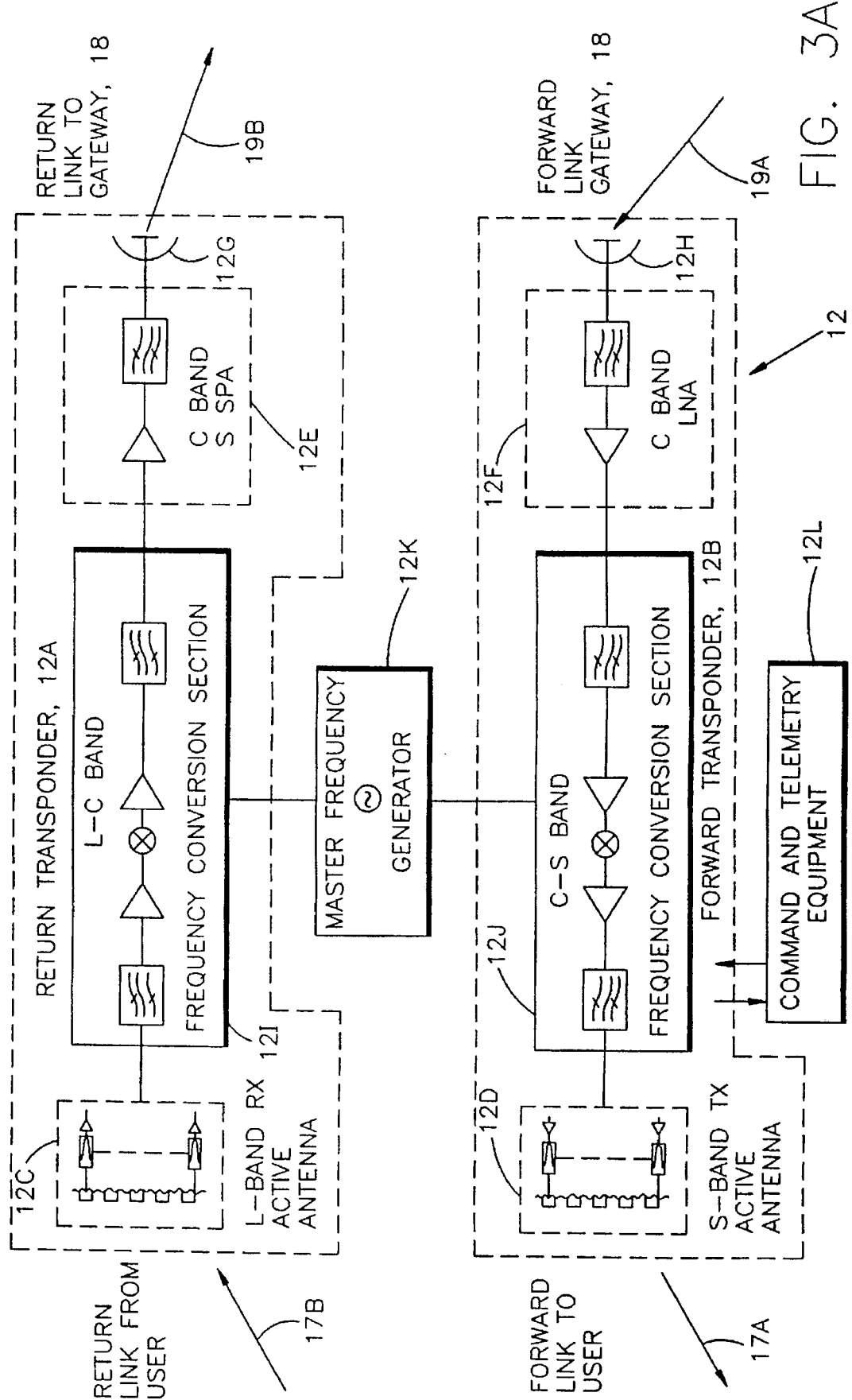
FIG. 3A is a block diagram of the communications payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal 13 may or may not be assigned a different channel than the channel assigned on the forward link. However, when operating in the diversity reception mode on the return link (receiving from two or more satellites 12), the user is assigned the same forward and return link RF channel for each of the satellites.

The ground segment 3 includes at least one but generally a plurality of the gateways 18 that communicate with the satellites 12 via, by example, a full duplex C band RF link 19 (forward link 19a (to the satellite), return link 19b (from the satellite)) that operates within a range of frequencies generally above 3 GHz and preferably in the C-band. The C-band RF links bi-directionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication system 10 the angle subtended from a given LEO satellite 12 (assuming 10° elevation angles from the earth's surface) is approximately 110°. This yields a coverage zone that is approximately 3600 miles in diameter.

Figure 3B:
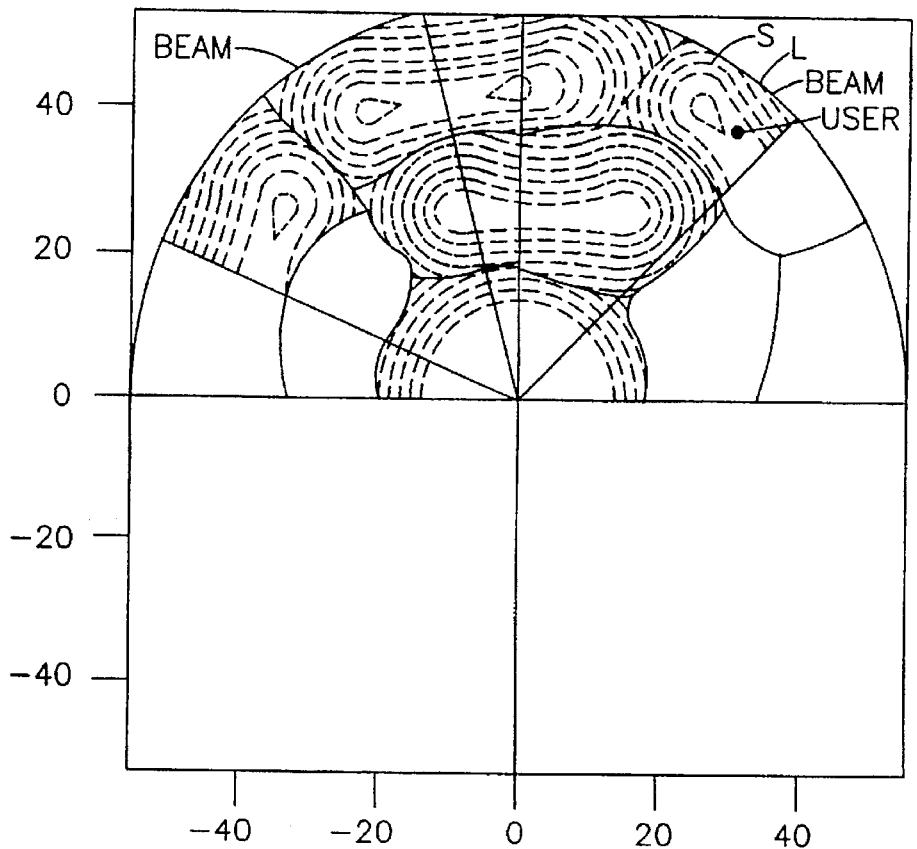
FIG. 3B illustrates a portion of a beam pattern that is associated with one of the satellites of FIG. 1.

The L-band and the S-band antennas are multiple beam antennas that provide coverage within an associated terrestrial service region. The L-band and S-band antennas 12d and 12c, respectively, are preferably congruent with one another, as depicted in FIG. 3B. That is, the transmit and receive beams from the spacecraft cover the same area on the earth's surface, although this feature is not critical to the operation of the system 10.

As an example, several thousand full duplex communications may occur through a given one of the satellites 12.

In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz).

The gateways 18 function to couple the communications payload or transponders 12a and 12b (FIG. 3A) of the satellites 12 to the telephone infrastructure segment 4. The transponders 12a and 12b include an L-band receive antenna 12c, S-band transmit antenna 12d, C-band power amplifier 12e, C-band low noise amplifier 12f, C-band antennas 12g and 12h, L band to C band frequency conversion section 12i, and C band to S band frequency conversion section 12j. The satellite 12 also includes a master frequency generator 12k and command and telemetry equipment 12l.

Reference in this regard may also be had to U.S. Pat. No. 5,422,647, by E. Hirshfield and C. A. Tsao, entitled "Mobile Communications Satellite Payload" (U.S. Ser. No. 08/060,207).

The telephone infrastructure segment 4 is comprised of existing telephone systems and includes Public Land Mobile Network (PLMN) gateways 20, local telephone exchanges such as regional public telephone networks (RPTN) 22 or other local telephone service providers, domestic long distance networks 24, international networks 26, private networks 28 and other RPTNs 30. The communication system 10 operates to provide bidirectional voice and/or data communication between the user segment 2 and Public Switched Telephone Network (PSTN) telephones 32 and non-PSTN telephones 32 of the telephone infrastructure segment 4, or other user terminals of various types, which may be private networks.

Also shown in FIG. 1 (and also in FIG. 4), as a portion of the ground segment 3, is a Satellite Operations Control Center (SOCC) 36, and a Ground Operations Control Center (GOCC) 38. A communication path, which includes a Ground Data Network (GDN) 39 (see FIG. 2), is provided for interconnecting the gateways 18 and TCUs 18a, SOCC 36 and GOCC 38 of the ground segment 3. This portion of the communications system 10 provides overall system control functions.

Figure 2:
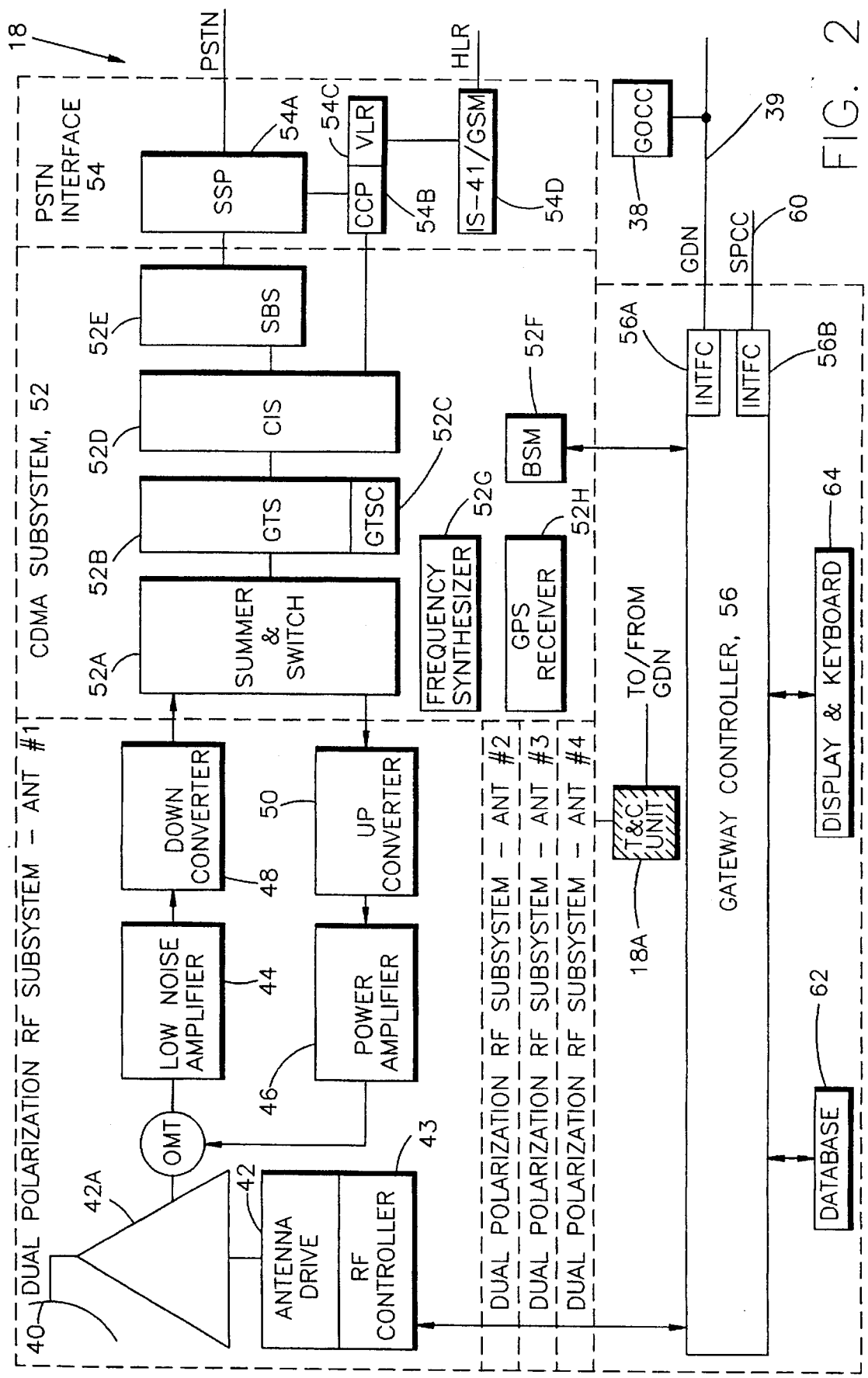
FIG. 2 is a block diagram of one of the gateways of FIG. 1.

FIG. 2 shows one of the gateways 18 in greater detail. Each gateway 18 includes up to four dual polarization RF C-band sub-systems each comprising a dish antenna 40, antenna driver 42 and pedestal 42a, low noise receivers 44, and high power amplifiers 46. All of these components may be located within a radome structure to provide environmental protection.

The gateway 18 further includes down converters 48 and up converters 50 for processing the received and transmitted RF carrier signals, respectively. The down converters 48 and the up converters 50 are connected to a CDMA sub-system 52 which, in turn, is coupled to the Public Switched Telephone Network (PSTN) though a PSTN interface 54. As an option, the PSTN could be bypassed by using satellite-to-satellite links.

The CDMA sub-system 52 includes a signal summer/switch unit 52a, a Gateway Transceiver Subsystem (GTS) 52b, a GTS Controller 52c, a CDMA Interconnect Subsystem (CIS) 52d, and a Selector Bank Subsystem (SBS) 52e. The CDMA sub-system 52 is controlled by a Base Station Manager (BSM) 52f and functions in a manner similar to a CDMA-compatible (for example, an IS-95 compatible) base station. The CDMA sub-system 52 also includes the required frequency synthesizer 52g and a Global Positioning System (GPS) receiver 52h.

The PSTN interface 54 includes a PSTN Service Switch Point (SSP) 54a, a Call Control Processor (CCP) 54b, a Visitor Location Register (VLR) 54c, and a protocol interface 54d to a Home Location Register (HLR). The HLR may be located in the cellular gateway 20 (FIG. 1) or, optionally, in the PSTN interface 54.

The gateway 18 is connected to telecommunication networks through a standard interface made through the SSP 54a. The gateway 18 provides an interface, and connects to the PSTN via Primary Rate Interface (PRI). The gateway 18 is further capable of providing a direct connection to a Mobile Switching Center (MSC).

The gateway 18 provides SS-7 ISDN fixed signalling to the CCP 54b. On the gateway-side of this interface, the CCP 54b interfaces with the CIS 52d and hence to the CDMA sub-system 52. The CCP 54b provides protocol translation functions for the system Air Interface (AI), which may be similar to the IS-95 Interim Standard for CDMA communications.

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for system 10/AMPS phones and for system 10/GSM phones. In service areas where there is no existing telecommunications infrastructure, an HLR can be added to the gateway 18 and interfaced with the SS-7 signalling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol interface 54d is bypassed when not required to convert, by example, GSM to AMPS.

It is within the scope of the teaching of this invention to provide a dedicated, universal interface to the cellular gateways 20, in addition to or in place of the conventional "A" interface specified for GSM mobile switching centers and vendor-proprietary interfaces to IS-41 mobile switching centers. It is further within the scope of this invention to provide an interface directly to the PSTN, as indicated in FIG. 1 as the signal path designated PSTN-INT.

Overall gateway control is provided by the gateway controller 56 which includes an interface 56a to the above-mentioned Ground Data Network (GDN) 39 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The GDN 39 is also bidirectionally interfaced to a Telemetry and Command (T&C) unit 66 (FIGS. 1 and 4).

Figure 4:
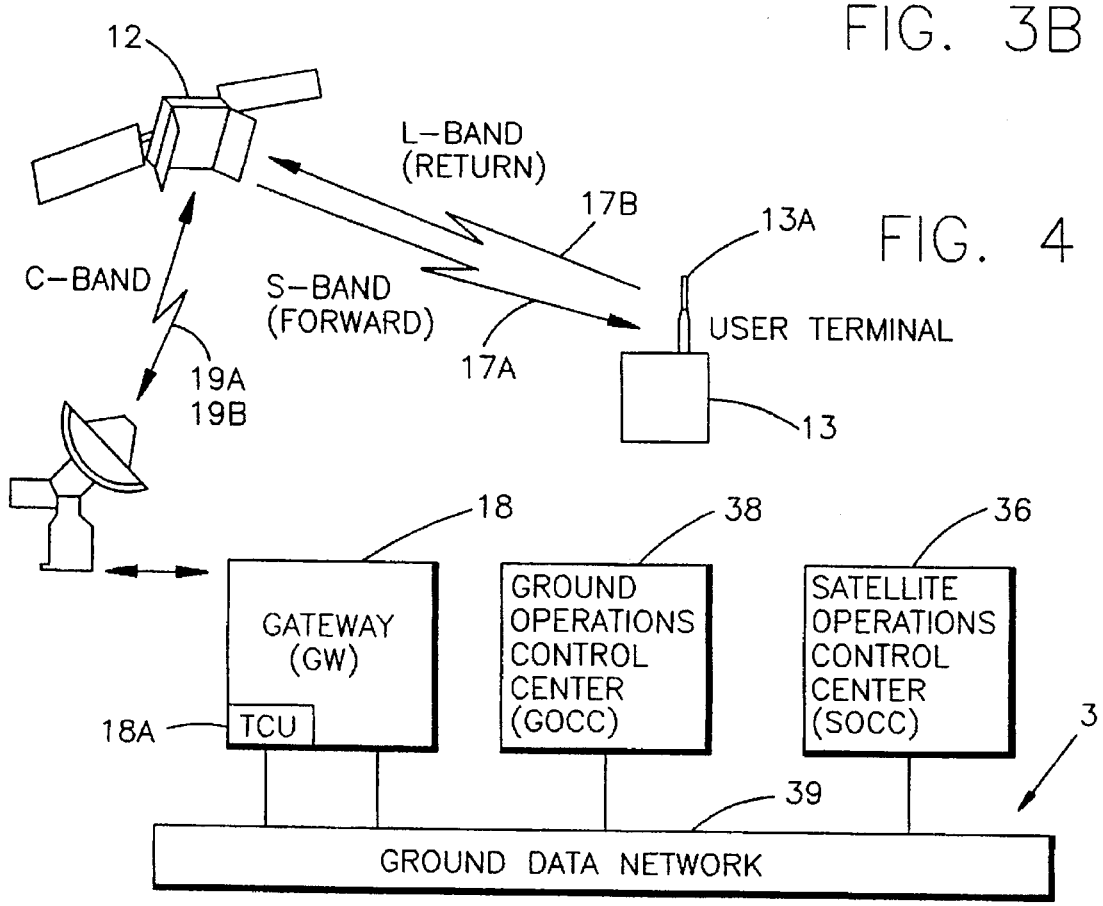
FIG. 4 is a block diagram that depicts the ground equipment support of satellite telemetry and control functions.

Referring to FIG. 4, the function of the GOCC 38 is to plan and control satellite utilization by the gateways 18, and to coordinate this utilization with the SOCC 36. In general, the GOCC 38 analyses trends, generates traffic plans, allocates satellite 12 and system resources (such as, but not limited to, power and channel allocations), monitors the performance of the overall system 10, and issues utilization instructions, via the GDN 39, to the gateways 18 in real time or in advance.

The SOCC 36 operates to maintain and monitor orbits, to relay satellite usage information to the gateway for input to the GOCC 38 via the GDN 39, to monitor the overall functioning of each satellite 12, including the state of the satellite batteries, to set the gain for the RF signal paths within the satellite 12, to ensure optimum satellite orientation with respect to the surface of the earth, in addition to other functions.

As described above, each gateway 18 functions to connect a given user to the PSTN for both signalling, voice and/or data communications and also to generate data, via database 62 (FIG. 2), for billing purposes. Selected gateways 18 include a Telemetry and Command Unit (TCU) 18a for receiving telemetry data that is transmitted by the satellites 12 over the return link 19b and for transmitting commands up to the satellites 12 via the forward link 19a. The GDN 39 operates to interconnect the gateways 18, GOCC 38 and the SOCC 36.

In general, each satellite 12 of the LEO constellation operates to relay information from the gateways 18 to the users (C band forward link 19a to S band forward link 17a), and to relay information from the users to the gateways 18 (L band return link 17b to C band return link 19b). This information includes SS-CDMA synchronization and paging channels, in addition to power control signals. Various CDMA pilot channels may also be used to monitor interference on the forward link. Satellite ephemeris update data is also communicated to each of the user terminals 13, from the gateway 18, via the satellites 12. The satellites 12 also function to relay signalling information from the user terminals 13 to the gateway 18, including access requests, power change requests, and registration requests. The satellites 12 also relay communication signals between the users and the gateways 18, and may apply security to mitigate unauthorized use.

In operation, the satellites 12 transmit spacecraft telemetry data that includes measurements of satellite operational status. The telemetry stream from the satellites, the commands from the SOCC 36, and the communications feeder links 19 all share the C band antennas 12g and 12h. For those gateways 18 that include a TCU 18a the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, is sent over the GDN 39 as packet messages, each packet message containing a single minor telemetry frame. Should more than one SOCC 36 be providing satellite support, the telemetry data is routed to all of the SOCCs.

The SOCC 36 has several interface functions with the GOCC 38. One interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to develop their own satellite contact lists, using known algorithms. The SOCC 36 is not required to known the gateway tracking schedules. The TCU 18a searches the downlink telemetry band and uniquely identifies the satellite being tracked by each antenna prior to the propagation of commands.

Another interface function is satellite status information that is reported from the SOCC 36 to the GOCC 38. The satellite status information includes both satellite/transponder availability, battery status and orbital information and incorporates, in general, any satellite-related limitations that would preclude the use of all or a portion of a satellite 12 for communications purposes.

An important aspect of the system 10 is the use of SS-CDMA in conjunction with diversity combining at the gateway receivers and at the user terminal receivers. Diversity combining is employed to mitigate the effects of fading as signals arrive at the user terminals 13 or the gateway 18 from multiple satellites over multiple and different path lengths. Rake receivers in the user terminals 13 and the gateways 18 are employed to receive and combine the signals from multiple sources. As an example, a user terminal 13 or the gateway 18 provides diversity combining for the forward link signals or the return link signals that are simultaneously received from and transmitted through the multiple beams of the satellites 12.

In this regard the disclosure of U.S. Pat. No. 5,233,626, issued Aug. 3, 1993 to Stephen A. Ames and entitled "Repeater Diversity Spread Spectrum Communication System", is incorporated by reference herein in its entirety.

The performance in the continuous diversity reception mode is superior to that of receiving one signal through one satellite repeater, and furthermore there is no break in communications should one link be lost due to shadowing or blockage from trees or other obstructions that have an adverse impact on the received signal.

The multiple, directional, antennas 40 of a given one of the gateways 18 are capable of transmitting the forward link signal (gateway to user terminal) through different beams of one or more satellites 12 to support diversity combining in the user terminals 13. The omnidirectional antennas 13a of the user terminals 13 transmit through all satellite beams that can be "seen" from the user terminal 13.

Each gateway 18 supports a transmitter power control function to address slow fades, and also supports block interleaving to address medium to fast fades. Power control is implemented on both the forward and reverse links. The response time of the power control function is adjusted to accommodate for a worst case 30 msec satellite round trip delay.

The block interleavers (53d, 53e, 53f, FIG. 5) operate over a block length that is related to vocoder 53g packet frames. An optimum interleaver length trades off a longer length, and hence improved error correction, at the expense of increasing the overall end-to-end delay. A preferred maximum end-to-end delay is 150 msec or less. This delay includes all delays including those due to the received signal alignment performed by the diversity combiners, vocoder 53g processing delays, block interleaver 53d–53f delays, and the delays of the Viterbi decoders (not shown) that form a portion of the CDMA sub-system 52.

Figure 5:
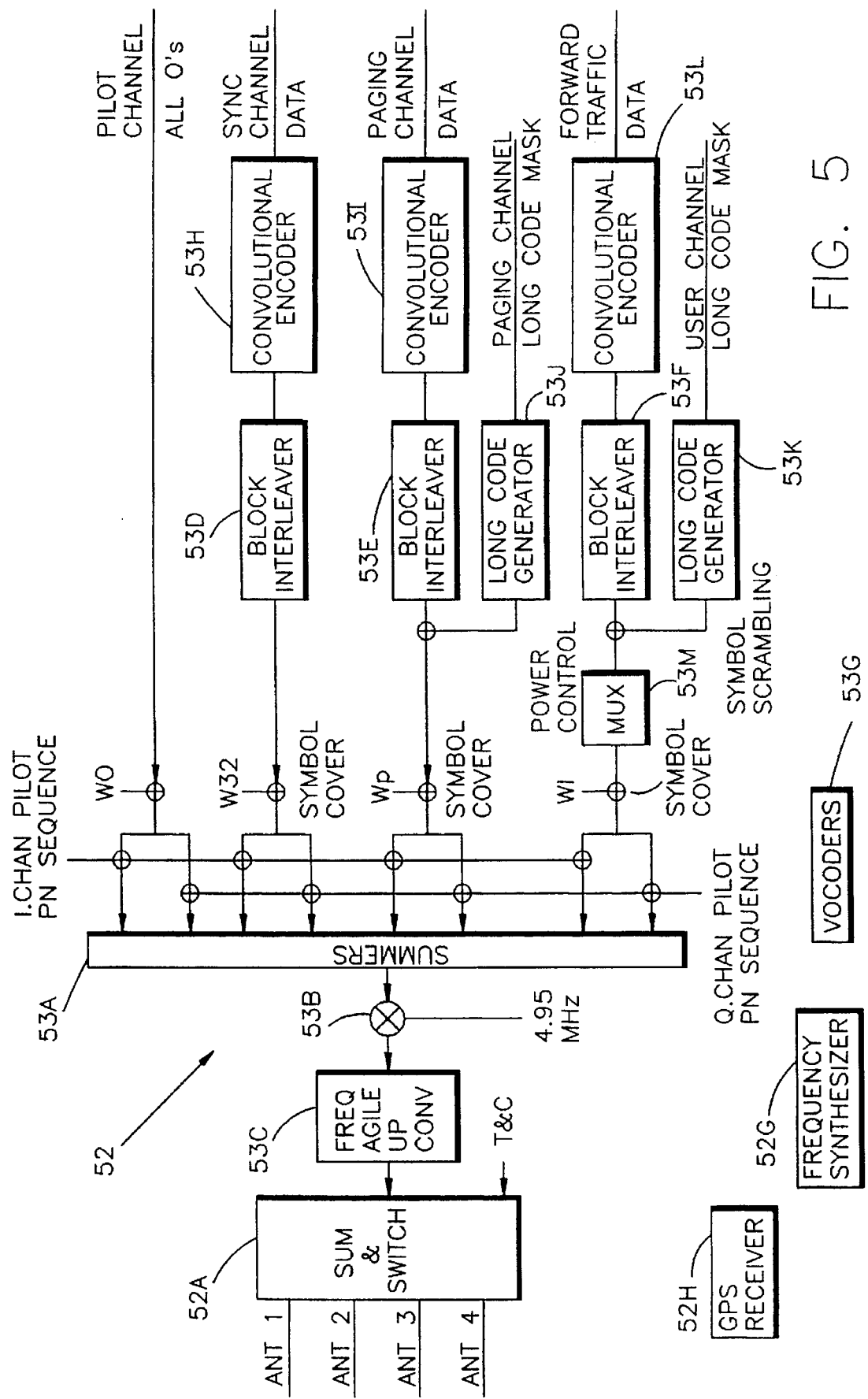
FIG. 5 is block diagram of the CDMA sub-system of FIG. 2.

FIG. 5 is a block diagram of the forward link modulation portion of the CDMA sub-system 52 of FIG. 2. An output of a summer block 53a feeds a frequency agile up-converter 53b which in turn feeds the summer and switch block 52a. The telemetry and control (T&C) information is also input to the block 52a.

An unmodulated direct sequence SS pilot channel generates an all zeros Walsh Code at a desired bit rate. This data stream is combined with a short PN code that is used to separate signals from different gateways 18 and different satellites 12. If used, the pilot channel is modulo 2 added to the short code and is then QPSK or BPSK spread across the CDMA FD RF channel bandwidth. The following different pseudonoise (PN) code offsets are provided: (a) a PN code offset to allow a user terminal 13 to uniquely identify a gateway 18; (b) a PN code offset to allow the user terminal 13 to uniquely identify a satellite 12; and (c) a PN code offset to allow the user terminal 13 to uniquely identify a given one of the 16 beams that is transmitted from the satellite 12. Pilot PN codes from different ones of the satellites 12 are assigned different time/phase offsets from the same pilot seed PN code.

If used, each pilot channel that is transmitted by the gateway 18 may be transmitted at a higher or lower power level than the other signals. A pilot channel enables a user terminal 13 to acquire the timing of the forward CDMA channel, provides a phase reference for coherent demodulation, and provides a mechanism to perform signal strength comparisons to determine when to initiate handoff. The use of the pilot channel is not, however, mandatory, and other techniques can be employed for this purpose.

The Sync channel generates a data stream that includes the following information: (a) time of day; (b) transmitting gateway identification; (c) satellite ephemeris; and (d) assigned paging channel. The Sync data is applied to a convolution encoder 53h where the data is convolutionally encoded and subsequently block interleaved to combat fast fades. The resulting data stream is modulo two added to the synchronous Walsh code and QPSK or BPSK spread across the CDMA FD RF channel bandwidth.

The Paging channel is applied to a convolutional encoder 53i where it is convolutionally encoded and is then block interleaved. The resulting data stream is combined with the output of a long code generator 53j. The long PN code is used to separate different user terminal 13 bands. The paging channel and the long code are modulo two added and provided to a symbol cover where the resulting signal is modulo two added to the Walsh Code. The result is then QPSK or BPSK spread across the CDMA FD RF channel bandwidth.

In general, the paging channel conveys several message types which include: (a) a system parameter message; (b) an access parameter message; and (c) a CDMA channel list message.

The system parameter message includes the configuration of the paging channel, registration parameters, and parameters to aid in acquisition. The access parameters message includes the configuration of the access channel and the access channel data rate. The CDMA channel list message conveys, if used, an associated pilot identification and Walsh code assignment.

The vocoder 53k encodes the voice into a PCM forward traffic data stream. The forward traffic data stream is applied to a convolutional encoder 53l where it is convolutionally encoded and then block interleaved in block 53f. The resulting data stream is combined with the output of a user long code block 53k. The user long code is employed to separate different subscriber channels. The resulting data stream is then power controlled in multiplexer (MUX) 53m, modulo two added to the Walsh code, and then QPSK or BPSK spread across the CDMA FD RF communication channel bandwidth.

The gateway 18 operates to demodulate the CDMA return link(s). There are two different codes for the return link: (a) the zero offset code; and (b) the long code. These are used by the two different types of return link CDMA Channels, namely the access channel and the return traffic channel.

For the access channel the gateway 18 receives and decodes a burst on the access channel that requests access. The access channel message is embodied in a long preamble followed by a relatively small amount of data. The preamble is the user terminal's long PN code. Each user terminal 13 has a unique long PN code generated by a unique time offset into the common PN generator polynomial.

After receiving the access request, the gateway 18 sends a message on the forward link paging channel (blocks 53e, 53i, 53j) acknowledging receipt of the access request and assigning a Walsh code to the user terminal 13 to establish a traffic channel. The gateway 18 also assigns a frequency channel to the user terminal 13. Both the user terminal 13 and the gateway 18 switch to the assigned channel element and begin duplex communications using the assigned Walsh (spreading) code(s).

The return traffic channel is generated in the user terminal 13 by convolutionally encoding the digital data from the local data source or the user terminal vocoder. The data is then block interleaved at predetermined intervals and is applied to a 128-Ary modulator and a data burst randomizer to reduce clashing. The data is then added to the zero offset PN code and transmitted through one or more of the satellites 12 to the gateway 18.

The gateway 18 processes the return link by using, by example, a Fast Hadamard Transform (FHT) to demodulate the 128-Ary Walsh Code and provide the demodulated information to the diversity combiner.

The foregoing has been a description of a presently preferred embodiment of the communication system 10. A description is now made of a presently preferred embodiment of the gateway-to-gateway relay system that is illustrated in FIGS. 6 and 7.

In accordance with the teaching of this invention multiple transceiver repeaters are located within overlapped coverage areas of two or more of the satellites 12. Any number of these repeaters may be employed, however for the purpose of the ensuing description two gateways 18 (designated A and B) and two satellites 12 and 12', having overlapping coverage areas 1 and 2 (respectively), are described in the context of a single LEOS relay station 70.

Figure 6:
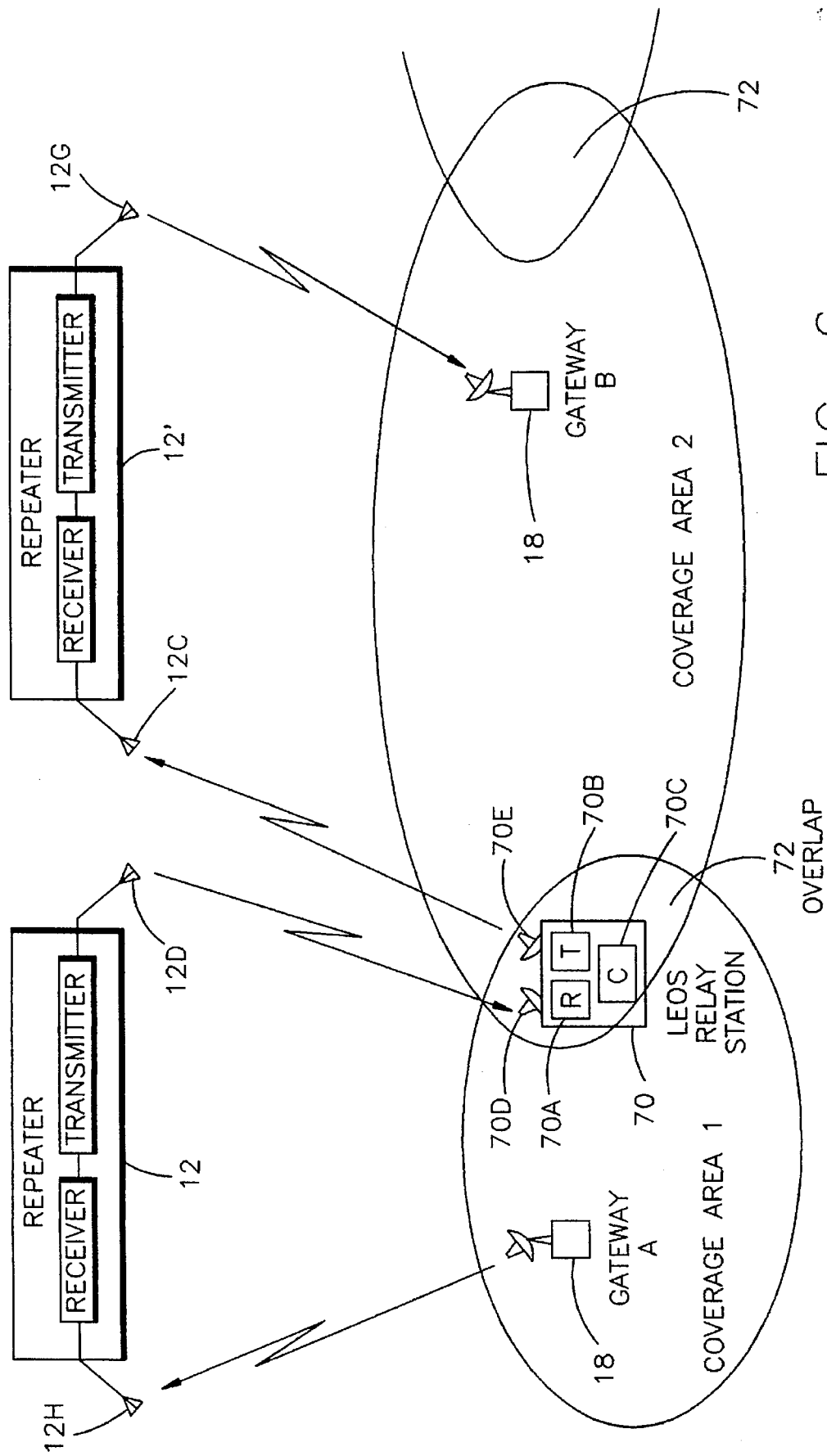
FIG. 6 is a block diagram of a LEO gateway-to-gateway relay system showing a communication path for a forward link.

Referring first to FIG. 6 for a forward link embodiment, the gateway A transmits a signal (which includes routing information and which may include other systems operation information) to a satellite 12 in the portion of the constellation that is currently overhead. The signal is received by antenna 12h (which may be a single beam or a beam of a multiple beam antenna) and is routed to the receiver which in turn sends the amplified signal, translated in frequency, to the transmitter and, thence, to transmit antenna 12d. The transmit antenna 12d may also be a single beam or a beam of a multiple beam array, and which forms a first coverage area on the earth. The second satellite 12' has the receive antenna 12c (which may be a single beam or a beam of a multiple beam antenna) with a second coverage area which overlaps the first coverage area within an overlap region designated 72. Located within the overlap region 72 is the LEOS relay station 70. The LEOS relay station 70 receives the signal transmitted from the satellite 12 with antenna 70d (which may be a directional, tracking, or omni-directional antenna) and with a receiver 70a. The receiver 70a demodulates the received signal to extract at least signal routing information therefrom. The LEOS relay station 70 subsequently employs a transmitter 70b and antenna 70e (which may be a directional, tracking, or omni-directional antenna) to transmit the signal, shifted in frequency, to satellite 12'. The signal routing information that is extracted by the receiver 70a is processed by a controller 70c. The transmitted signal is received by satellite antenna 12c (which may be a single beam or a beam of a multiple beam antenna) and sent to the receiver which in turn sends the amplified signal, translated in frequency, to the transmitter and, via antenna 12g (which may also be a single beam or a beam of a multiple beam antenna), to the gateway B. Gateway B serves the second coverage area.

Figure 7:
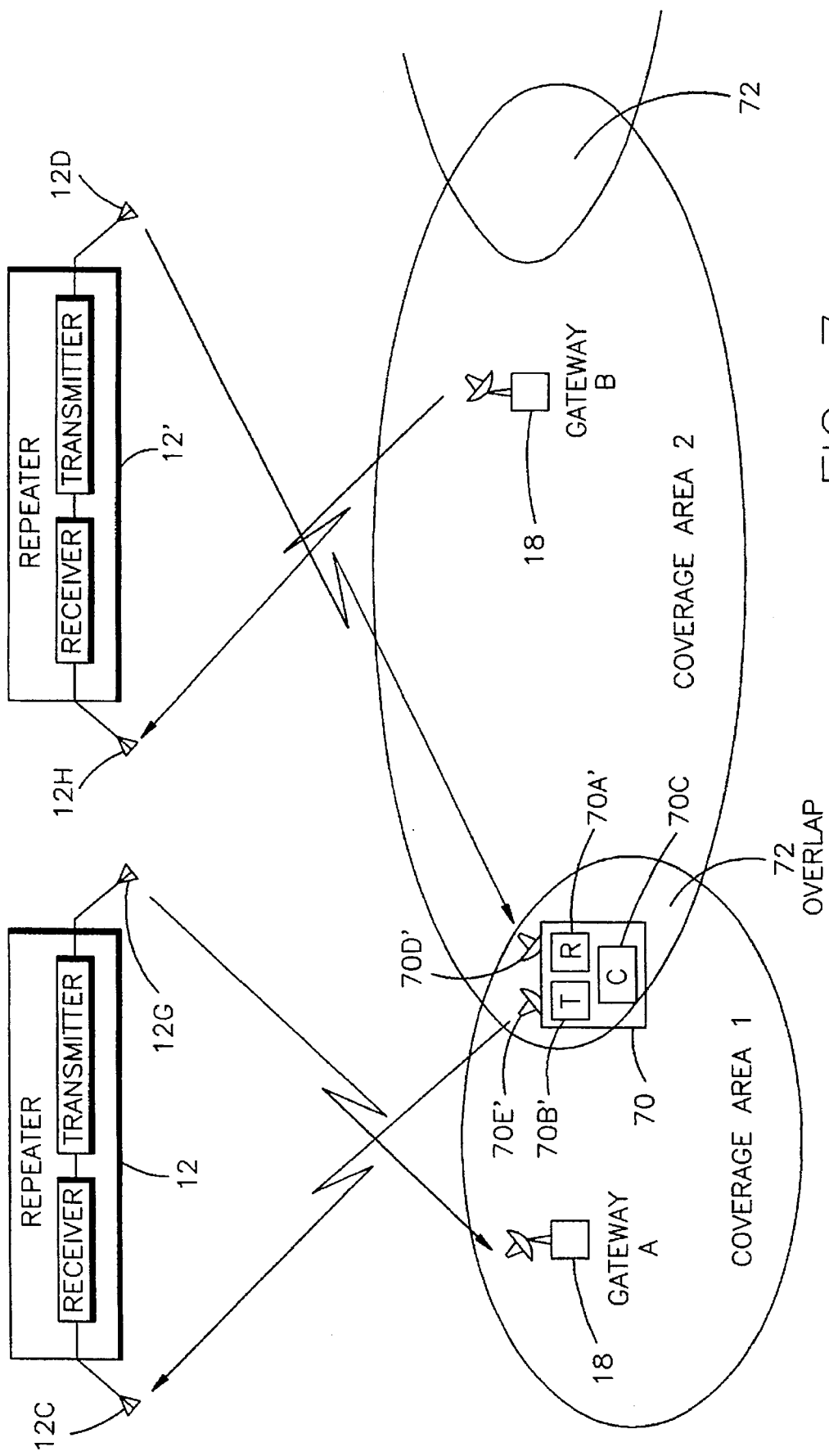
FIG. 7 is a block diagram of the LEO gateway-to-gateway relay system showing the communication path for a reverse link.

Referring to FIG. 7 for the return link, the gateway B transmits a signal (which includes routing information and may include other systems operation information) to the satellite 12'. The signal is received by antenna 12h (which may be a single beam or a beam of a multiple beam antenna) and sent to the receiver which in turn sends the amplified signal, translated in frequency, to the transmitter and, thence, to transmit antenna 12d. The transmit antenna 12d may also be a single beam or a beam of a multiple beam array, and which forms the first coverage area on the earth. The satellite 12 includes the receive antenna 12c (which may be a single beam or a beam of a multiple beam antenna) having a second coverage area which overlaps the first coverage area within the overlap region 72. The LEOS relay station 70 receives the signal transmitted from the satellite 12' with an antenna 70d' (which may be a directional, tracking, or omni-directional antenna) and with a receiver 70a' of a second transmitter/receiver (transceiver) pair. The receiver 70a' demodulates the received signal to extract at least the signal routing information therefrom. The LEOS relay station 70 subsequently employs transmitter 70b' and antenna 70e' (which may be a directional, tracking, or omni-directional antenna) to transmit the signal, shifted in frequency, to satellite 12. The transmitted signal is received by satellite antenna 12c (which may be a single beam or a beam of a multiple beam antenna) and is sent to the receiver which in turn sends the amplified signal, translated in frequency, to the transmitter and, via antenna 12g (which may be a single beam or a beam of a multiple beam antenna), to the gateway A.

In accordance with the foregoing description, and referring also to FIG. 3A which shows the various transmit and receive antennas of a satellite 12, it can be seen that the LEOS relay station 70 receives and transmits SS signals with the frequencies normally employed by the user terminals 13.

Only one LEOS relay station 70 is required to be located within a given overlap region 72, although more can be so positioned to provide immunity from fading and signal blockages due to obstructions as the elevation angles of the satellites 12 and 12' vary. Preferably a significant portion of the earth's surface has the overlapped coverage regions 72, and therefore a given one of the LEOS relay stations 70 is typically located at some intermediate distance between gateway A and gateway B. The controller 70c within the LEOS relay station 70 may provide alternate routing if required.

Figure 8:
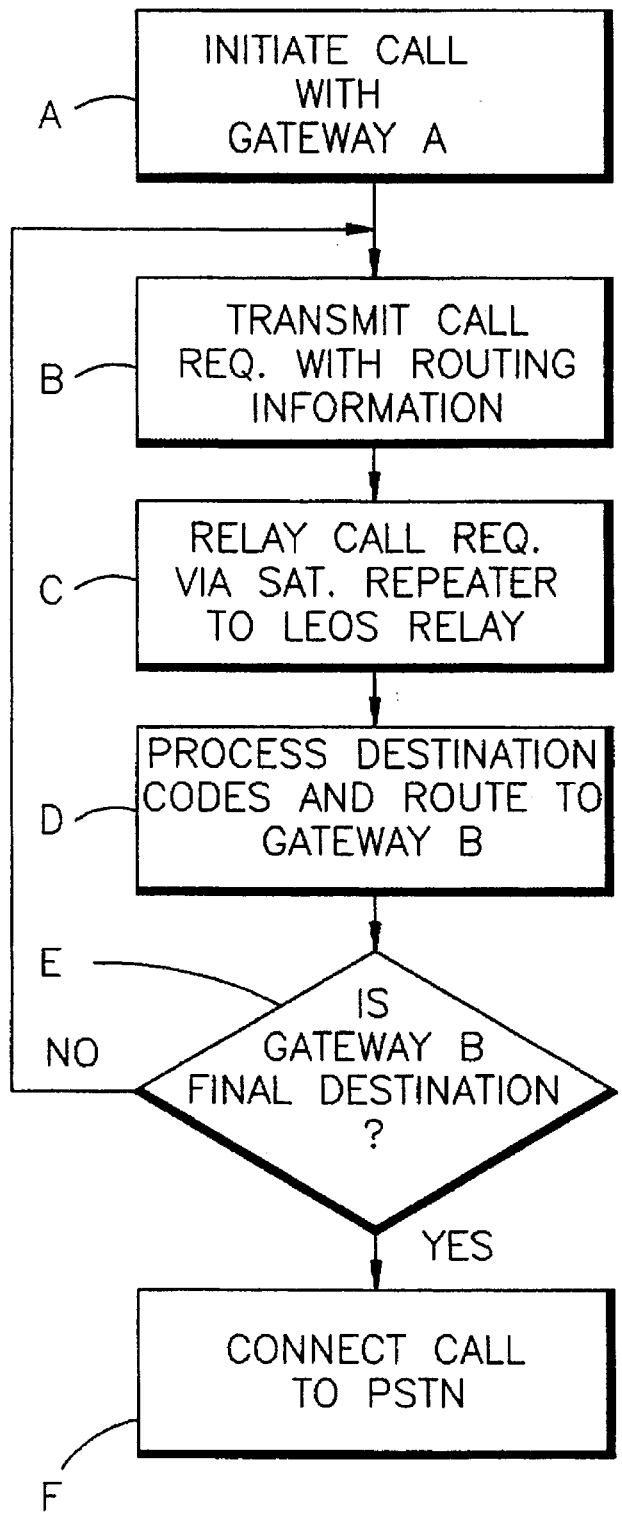
FIG. 8 is a flow chart depicting the sequence of steps that are executed by a method of this invention.

Operation of the system occurs as is depicted in the flow chart of FIG. 8. Referring also to FIG. 6, it is assumed that a user employs the gateway A to place a call, via gateway B, to another user (Block A). The call set-up data is packetized or otherwise formatted in the gateway A to include call routing (destination code) information and a request for service is transmitted, with the routing information, via the satellite 12 to all LEOS relay stations 70 in view of the satellite 12 or within a specific beam of the satellite 12 (Blocks B and C). Each LEOS relay station 70 down converts the received signal to baseband (or to a point sufficient to extract the destination and any instructional information), using a suitable SS-CDMA despreader and demodulator, and extracts the destination code information from the received signal. The controller 70c of at least one of the receiving LEOS relay stations 70 selects a satellite 12, or broadcasts to all satellites in view of the LEOS relay station 70, to route the signal to a further gateway 18. The relay satellite may be selected as a function of the destination information included in the packetized call routing information, or may be selected based on a database look-up table. Assuming for this discussion that the gateway B is the selected gateway, the signal is then transmitted to gateway B via satellite 12' (Block D). Gateway B then down converts the received signal to baseband and, depending upon the destination code, makes a determination (Block E) if the gateway B is the final destination gateway. If the result of the determination is no, then control passes to Block B where the call may be routed through a further satellite 12, gateway 18, and possibly a further LEOS relay station 70. If the result of the determination at Block E is yes, the gateway B may connect the call to the local telephone infrastructure segment 4, such as routing the call to the local PSTN (Block F). Return messages, if any, are processed in the same manner. It can be appreciated that near real time voice, data and messaging is made possible using this technique.

The LEOS relay station 70 is preferably constructed with two independent transceivers operating in pairs (70a, 70b and 70a', 70b'). The LEOS relay station 70 operates under the control of the serving gateways 18, and programs included in the controller 70c enable real time or preprogrammed routing decisions to be made locally at the LEOS relay station 70. Directional antennas 70d, 70e (FIG. 6) and 70d', 70e' (FIG. 7) may be used at the LEOS relay station 70, although non-directional or omni-directional antennas may also be employed. Each LEOS relay station 70 includes circuitry, such as that illustrated in FIGS. 2 and 5, for despreading, demodulating, tracking, and transmitting a spread spectrum signal. Each LEOS relay station 70 preferably is constructed to have multiple finger rake receivers, or other suitable receiver types, that are capable of simultaneously receiving and tracking multiple SS signals. As a result, a single LEOS relay station 70 can be used for simultaneously relaying multiple communications, such as telephone calls, from one satellite coverage area to another.

Figure 9:
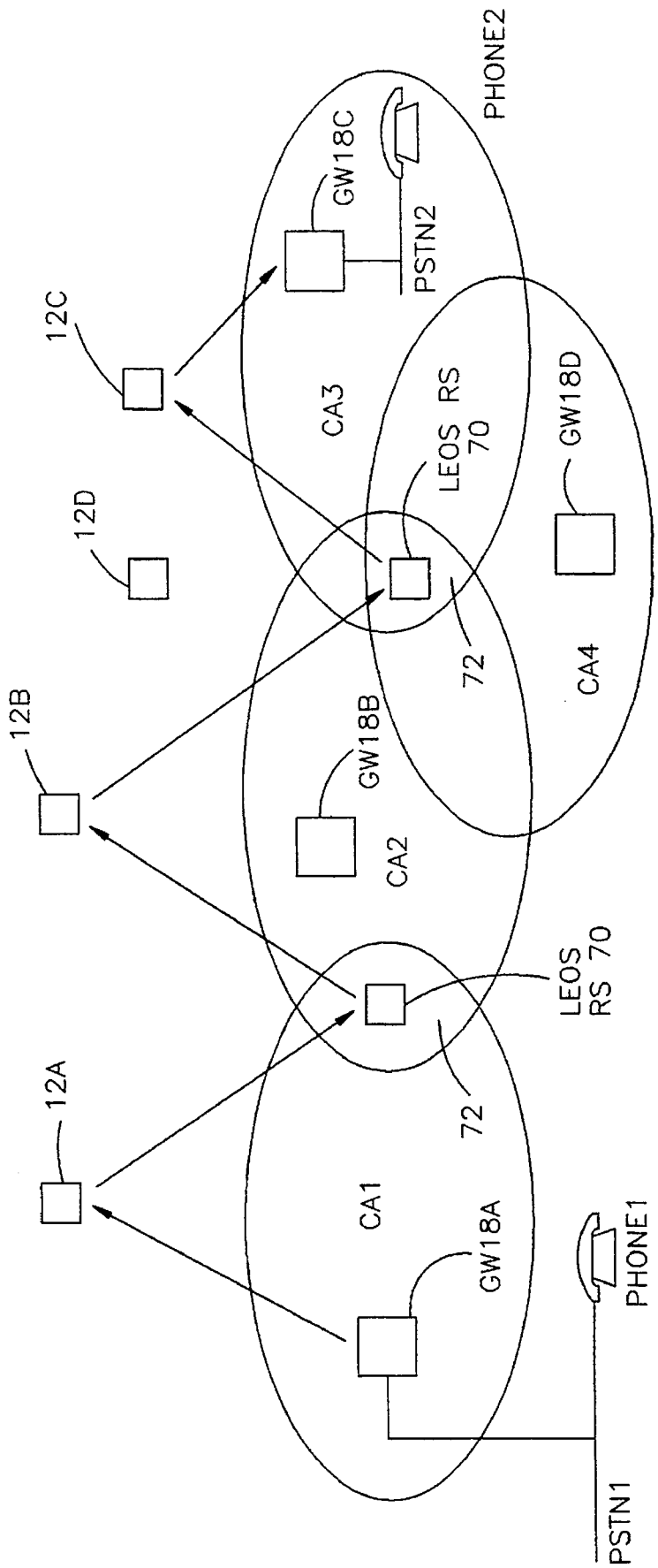
FIG. 9 is block diagram that illustrates a first example of the use of this invention.

Reference is now made to FIG. 9 for illustrating a first example of the use of this invention. In this example a plurality of satellites 12A–12D each have an associated coverage area (CA) 1–4, respectively. Each of the coverage areas 1–4 is served by a gateway 18A–18D, respectively. Overlap regions 72 are formed between the various coverage areas. Within each overlap region is at least one LEOS relay station (RS) 70. In this example, a system user employs phone 1 to place a call via a terrestrial communication system (e.g., PSTN 1) to phone 2 connected to PSTN 2. Phone 1 and phone 2 may be separated by thousands of kilometers and may be fixed or mobile. In response to placing the call from phone 1 the gateway 18A forms a call request packet that includes destination information and other instructions and transmits the call request packet to LEO satellite 12A. Satellite 12A repeats the call request on the downlink. The call request is received by the LEOS RS 70 in the overlap region 72 between CA1 and CA2. This LEOS RS 70 despreads and demodulates the transmission to extract the destination information from the call request packet. Based on the destination information, or in accordance with preprogrammed instructions, the LEOS RS 70 selects the LEO satellite 12B to receive the transmission. If an omnidirectional antenna is used the LEOS RS 70 can broadcast to all satellites 12 that are in view of the LEOS RS 70. Assuming that the transmission is directed to satellite 12B, the satellite relays the transmission to the LEOS RS 70 in the overlap region 72 between CA2, CA3 and CA4. This LEOS RS 70 extracts the destination information from the call request packet and selects the satellite 12C to receive the transmission. The satellite 12C repeats the transmission on the downlink which is received by the gateway 18C which, based on the destination information, connects the call to the PSTN 2 for delivery to the phone 2.

It can be appreciated that the call is routed from PSTN 1 to PSTN 2 without using the PSTN that is connected to either the gateway 18B or the gateway 18D. Furthermore, the call is routed without requiring any satellite-to-satellite communication links. This greatly simplifies the construction and operation of the satellites 12A–12B.

Figure 10:
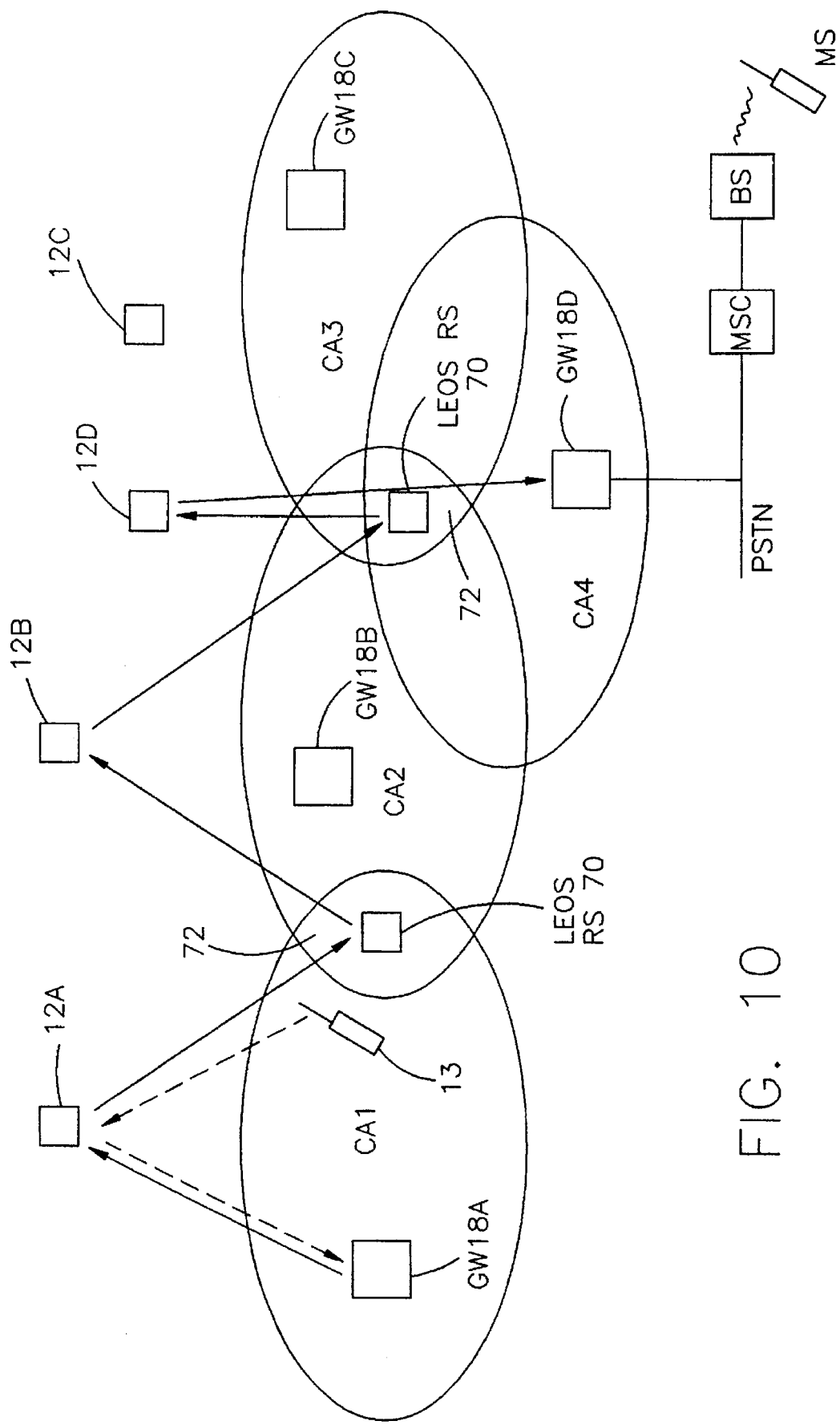
FIG. 10 is block diagram that illustrates a second example of the use of this invention.

FIG. 10 is a further example of the utility of this invention. In FIG. 10 a user terminal 13 within CA1 initiates a call to a mobile user having a mobile station (MS) that is coupled via a base station (BS) and a mobile switching center (MSC) to a PSTN that is connected to gateway 18D within CA4. The call initiated by mobile user 13 is relayed via satellite 12A to the gateway 18A in the manner described previously with respect to FIG. 1. The gateway 18A forms a call request packet that includes destination and other information and transmits the call request packet to LEO satellite 12A. Satellite 12A repeats the call request on the downlink. The call request is received by the LEOS RS 70 in the overlap region 72 between CA1 and CA2. This LEOS RS 70 despreads and demodulates the transmission to extract the destination information from the call request packet. Based on the destination information, the LEOS RS 70 selects the LEO satellite 12B to receive the transmission. Satellite 12B relays the transmission to the LEOS RS 70 in the overlap region 72 between CA2, CA3 and CA4. This LEOS RS 70 extracts the destination information from the call request packet and selects the satellite 12D to receive the transmission. The satellite 12D repeats the transmission on the downlink which is received by the gateway 18D which, based on the destination information, connects the call to the PSTN for delivery, via the MSC and BS, to the MS.

Although described in the context of a SS-CDMA communication system the teaching of this invention is not so limited. That is, the teaching of this invention may also be used, with suitable adaptation, with other types of communication systems, such as time division multiple access (TDMA), frequency division multiple access (FDMA), and hybrid systems, such as a TD-SS communication system. Furthermore, aspects of this invention can also be employed in non-LEO satellite systems, such as in mid-earth orbit satellite systems (e.g., inclined orbits in the range of approximately 5000 to 10,000 nautical miles).

Thus, while the invention has been particularly shown and described with respect to preferred embodiments thereof, it will be understood by those skilled in the art that changes in form and details may be made therein without departing from the scope and spirit of the invention.

What is claimed is:

1. A communication system, comprising:
   at least first and second earth orbiting satellites individual ones of which comprise means for transceiving first communication signals with terrestrially located user terminals and for transceiving second communication signals with terrestrially located stations, said first communication signals being within a first band of frequencies and said second communication signals being within a second band of frequencies, said at least two earth orbiting satellites having first and second terrestrial coverage areas, respectively;
   at least one terrestrial repeater station that is located within an overlapped region between said first and second terrestrial coverage areas, said at least one terrestrial repeater station being comprised of a first transceiver for receiving a first communication signal from a first one of said satellites associated with said first satellite coverage area and for transmitting said received first communication signal to a second one of said satellites associated with said second satellite coverage area, whereby a communication forward link is established between a first station located within said first satellite coverage area and a second station located within said second satellite coverage area;
   wherein said at least one terrestrial repeater station is further comprised of a second transceiver for receiving a first communication signal from said second one of said satellites associated with said second satellite coverage area and for transmitting said received first communication signal to said first one of said satellites associated with said first satellite coverage area, whereby a communication return link is established between said first station and said second station.

2. A communication system, comprising:
   at least first and second earth orbiting satellites individual ones of which comprise means for transceiving first communication signals with terrestrially located user terminals and for transceiving second communication signals with terrestrially located stations, said first communication signals being within a first band of frequencies and said second communication signals being within a second band of frequencies, said at least two earth orbiting satellites having first and second terrestrial coverage areas, respectively;
   at least one terrestrial repeater station that is located within an overlapped region between said first and second terrestrial coverage areas, said at least one terrestrial repeater station being comprised of a first transceiver for receiving a first communication signal from a first one of said satellites associated with said first satellite coverage area and for transmitting said received first communication signal to a second one of said satellites associated with said second satellite coverage area, whereby a communication forward link is established between a first station located within said first satellite coverage area and a second station located within said second satellite coverage area;
   wherein said at least one terrestrial repeater station is further comprised of means for demodulating a call request transmission that is received from said first satellite, and means for extracting call destination information from said demodulated call request transmission.

3. A communication system as set forth in claim 2 wherein said at least one terrestrial repeater station is further comprised of means for selecting a satellite to receive said transmission from said terrestrial repeater station.

4. A communication system as set forth in claim 2 wherein said demodulating means includes means for despreading a spread spectrum signal that is received from said first satellite.

5. A communication system, comprising:

at least first and second earth orbiting satellites individual ones of which comprise means for transceiving first communication signals with terrestrially located user terminals and for transceiving second communication signals with terrestrially located stations, said first communication signals being within a first band of frequencies and said second communication signals being within a second band of frequencies, said at least two earth orbiting satellites having first and second terrestrial coverage areas, respectively;

at least one terrestrial repeater station that is located within an overlapped region between said first and second terrestrial coverage areas, said at least one terrestrial repeater station being comprised of a first transceiver for receiving a first communication signal from a first one of said satellites associated with said first satellite coverage area and for transmitting said received first communication signal to a second one of said satellites associated with said second satellite coverage area, whereby a communication forward link is established between a first station located within said first satellite coverage area and a second station located within said second satellite coverage area;

wherein said first and second earth orbiting satellites are a portion of a constellation of low earth orbit (LEO) repeater satellites.

6. A communication system as set forth in claim 5 wherein said constellation is comprised of 48 satellites distributed in eight orbital planes with six equally-spaced satellites per plane, said orbital planes being inclined at 52 degrees with respect to the equator.

7. A method for operating a communication system having a constellation of low earth orbit (LEO) repeater satellites each having an associated ground coverage region for bidirectionally communicating with terrestrial transceivers, including ground stations and user terminals that are located within the associated ground coverage region, comprising the steps of:

initiating a communication with a first ground station by forming a communication request that includes information for specifying a destination for the communication;

transmitting the communication request from the first ground station to a first LEO repeater satellite;

repeating the communication request by receiving and transmitting the communication request with the first LEO repeater satellite;

receiving the communication request with a ground repeater station that is located within the ground coverage region of the first LEO repeater satellite;

extracting the information that specifies the destination for the communication from the received communication request;

selecting, at least partially in accordance with the extracted information, at least one further LEO repeater satellite;

transmitting the communication request from the ground repeater station to the at least one selected LEO repeater satellite, the at least one selected LEO repeater satellite having a ground coverage region that overlaps the ground coverage region of the first LEO repeater satellite;

repeating the communication request by receiving and transmitting the communication request with the at least one selected LEO repeater satellite;

receiving the repeated communication request with at least one further ground station; and establishing a communication link to a terrestrial communication network in accordance with the destination specified by the call request.

8. A method as set forth in claim 7 wherein the step of extracting includes a step of despreading and demodulating a spread spectrum communication signal.

9. A method as set forth in claim 7 wherein the constellation is comprised of 48 satellites distributed in eight orbital planes with six equally-spaced satellites per plane, and wherein the orbital planes are inclined at 52 degrees with respect to the equator.

10. A ground-based repeater station for use with a plurality of low earth orbit (LEO) communication satellites individual ones of which have an associated ground coverage area, comprising:

a first transceiver for receiving a downlink transmission from a first one of said LEO communication satellites associated with a first coverage area and for transmitting said received transmission on an uplink to a second one of said LEO communication satellites associated with a second coverage area that overlaps the first coverage area;

a second transceiver for receiving a downlink transmission from said second one of said LEO communication satellites associated with said second coverage area and for transmitting said received transmission on an uplink to said first one of said LEO communication satellites associated with said first coverage area;

means for demodulating a call request transmission that is received from said first LEO communication satellite;

means for extracting call destination information from said demodulated call request transmission; and means for selecting a LEO communication satellite to receive said uplink transmission.

11. A ground-based repeater station as set forth in claim 10 wherein said demodulating means includes means for despreading a spread spectrum signal that is received from said first LEO communication satellite.

12. A method for operating a communication system having a constellation of low earth orbit (LEO) repeater satellites each having an associated ground coverage region for bidirectionally communicating with terrestrial transceivers, including ground stations and user terminals that are located within the associated ground coverage region, comprising the steps of:

initiating a communication by sending a transmission from a user terminal to a first LEO repeater satellite;

repeating the transmission through the first LEO repeater satellite to a first ground station;

forming a communication request with the first ground station, the communication request including information for specifying a destination for the communication;

transmitting the communication request from the first ground station to the first LEO repeater satellite;

repeating the communication request by receiving and transmitting the communication request with the first LEO repeater satellite;

receiving the communication request with a ground repeater station that is located within the ground coverage region of the first LEO repeater satellite;

transmitting the communication request from the ground repeater station to at least one further LEO repeater satellite, the at least one further LEO repeater satellite having a ground coverage region that overlaps the ground coverage region of the first LEO repeater satellite;

repeating the communication request by receiving and transmitting the communication request with the at least one further LEO repeater satellite;

receiving the repeated communication request with at least one further ground station; and establishing a communication link to a terrestrial communication network in accordance with the destination specified by the call request.

13. A method as set forth in claim 12 wherein the steps of transmitting and receiving each include a step of amplifying a spread spectrum communication signal.

14. A method as set forth in claim 12 wherein the constellation is comprised of 48 satellites distributed in eight orbital planes with six equally-spaced satellites per plane, and wherein the orbital planes are inclined at 52 degrees with respect to the equator.

* * * * *